(12) United States Patent
Fritsch

(10) Patent No.: US 11,366,014 B2
(45) Date of Patent: Jun. 21, 2022

(54) SPECTROMETER AND METHOD FOR ANALYZING A LIGHT SAMPLE USING A SPECTROMETER

(71) Applicant: KROHNE Messtechnik GmbH, Duisburg (DE)

(72) Inventor: Thomas Fritsch, Neuss (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 44 days.

(21) Appl. No.: 16/589,371

(22) Filed: Oct. 1, 2019

(65) Prior Publication Data

US 2020/0103282 A1 Apr. 2, 2020

(30) Foreign Application Priority Data

Oct. 2, 2018 (DE) .................... 10 2018 124 345.6

(51) Int. Cl.
*G01J 3/50* (2006.01)
*G01J 3/04* (2006.01)
*G01J 3/02* (2006.01)
*G01J 3/18* (2006.01)
*G01J 3/10* (2006.01)

(52) U.S. Cl.
CPC ............. *G01J 3/502* (2013.01); *G01J 3/0208* (2013.01); *G01J 3/04* (2013.01); *G01J 3/18* (2013.01); *G01J 3/10* (2013.01)

(58) Field of Classification Search
CPC ........ G01J 3/0208; G01J 3/021; G01J 3/0218; G01J 3/0237; G01J 3/0291; G01J 3/0294; G01J 3/04; G01J 3/10; G01J 3/18; G01J 3/502

USPC .......................................................... 356/328
See application file for complete search history.

(56) References Cited

U.S. PATENT DOCUMENTS

| | | | |
|---|---|---|---|
| 5,488,474 A | 1/1996 | Fateley et al. | |
| 6,208,413 B1 | 3/2001 | Diehl et al. | |
| 2004/0125361 A1 | 7/2004 | Riza et al. | |
| 2012/0105846 A1 | 5/2012 | Funayama et al. | |
| 2015/0264250 A1* | 9/2015 | Ou ........................ | G02B 27/46 348/77 |
| 2017/0199363 A1* | 7/2017 | Mazilu ............... | G02B 21/0076 |
| 2018/0113074 A1 | 4/2018 | Gigler et al. | |
| 2018/0313796 A1* | 11/2018 | Jeannotte .............. | G01J 3/0262 |
| 2020/0003618 A1* | 1/2020 | Fujita ................... | G02B 21/004 |

FOREIGN PATENT DOCUMENTS

DE 19932807 A1 1/2001

* cited by examiner

*Primary Examiner* — Sunghee Y Gray
(74) *Attorney, Agent, or Firm* — David S. Safran; Roberts Calderon Safran & Cole, P.C.

(57) ABSTRACT

A spectrometer including at least one light-coupling element, a variable entrance slit, a dispersive element, a detector element and a control and evaluation unit. The object of providing a spectrometer having improved measuring characteristics is achieved in that the variable entrance slit is implemented by a first spatial modulation element including a plurality of pixels, wherein the individual pixels can be arranged independently of one another by the control and evaluation unit, wherein the individual pixels are arranged in order to implement the entrance slit during operation in such a manner that at least part of the light incident from the light-coupling element is passed on to the dispersive element.

6 Claims, 4 Drawing Sheets

SPECTROMETER AND METHOD FOR ANALYZING A LIGHT SAMPLE USING A SPECTROMETER

BACKGROUND OF THE INVENTION

Field of the Invention

The invention is based on a spectrometer including at least one light-coupling element, a variable entrance slit, a dispersive element, a detector element and a control and evaluation unit. In addition, the invention relates to a method for analyzing a light sample using a spectrometer, wherein the spectrometer includes at least one light-coupling element, a variable entrance slit, a dispersive element, a detector element and a control and evaluation unit.

Description of the Related Art

It is known from the prior art to draw conclusions about the analyte emitting the light sample from the spectral composition of a light sample. For this, the light of a light sample in a spectrometer is broken down into its spectral components by a dispersive element, such as an optical grating. The individual spectral components are then detected by a detector so that the spectrum of the light sample can be displayed and analyzed. In order to ensure the coherence of the light sample to be analyzed, the light to be analyzed first hits an entrance slit, which is imaged onto the detector element via an optical path.

In principle, the spectral resolution of a spectrometer is determined by the width of the entrance slit. The determination of the slit width is an optimization task, which, in its framework, includes conditions such as the size of the detector element or, in the case of a line detector of the individual detector elements, the size of the overall structure and the luminous efficacy. If the detector and the size of the optical system are given, the resolution can be increased by reducing the slit width, but if the slit width is reduced, less light enters the spectrometer. On the other hand, in particularly low-light applications, the light yield can be increased at the expense of resolution.

Various solutions for adjusting the slit width are known in the current state of the art: The slit width of the entrance slit can be varied by manually changing a disc into which the slit is cut or by manually moving one or both limiting discs of the slit using a micrometer screw or by (semi-)automatic mechanical adjustment using motorized micrometer screws.

The disadvantage of these devices is the low speed with which the slit width can be changed and the high mechanical complexity, which is due to the slit width having to be set exactly on a µm scale and the two limits having to remain parallel.

A spectrometer is known from the document German Patent DE 199 32 807 A1, wherein the entrance slit consists of a movable diaphragm and a fixed diaphragm is periodically modulated in order to be able to use highly sensitive and drift-free amplifiers in signal processing.

In addition, a method for measuring the beam properties of a laser beam is known from the US Patent Application Publication 2004/0125361 A1, wherein the laser beam is broken down by means of a micro-mirror array based on the razor blade method.

SUMMARY OF THE INVENTION

The object of the invention is to provide a spectrometer with improved measuring properties. In addition, the object of the invention is to provide an appropriate method for analyzing a light sample.

According to a first teaching of the invention, this object is achieved by a spectrometer mentioned in the introduction in that the variable entrance slit is implemented by a first spatial modulation element including a plurality of pixels, wherein the individual pixels can be arranged independently of one another by the control and evaluation unit, wherein the individual pixels are arranged in order to implement the entrance slit during operation in such a manner that at least a part of the light incident from the light-coupling element is passed on to the dispersive element.

According to the invention, it has been recognized that the entrance slit of a spectrometer can be implemented by a first reflecting or transmitting spatial modulation element including a plurality of separately controllable pixels, wherein the entrance slit can be varied particularly easily and flexibly by the separate controllability of the individual pixels. The individual pixels are arranged by the control and evaluation unit.

According to the invention, the image of the light to be analyzed which hits the first spatial modulation element is spatially formed by the adjustment or deflection of the individual pixels, wherein parts of the image that are not to be analyzed are attenuated in their intensity and/or deflected away from the dispersive element in their direction of propagation.

In principle, the present invention distinguishes between a first position or arrangement of the pixels in which the light to be analyzed is transmitted to the dispersive element (ON position) and a second position or arrangement of the pixels in which the light is not transmitted to the spectrometer so that it is not available for analysis (OFF position). In this manner, the image of the light-coupling element can be trimmed particularly precisely by arranging the individual pixels.

According to a particularly preferred design, the individual pixels of the first spatial modulation element are arranged in the form of a matrix.

According to one design, the first spatial modulation element is the first micro-mirror array, with the plurality of the pixels being implemented by a plurality of micro-mirrors.

According to one design, the micro-mirrors are controlled digitally so that the individual micro-mirrors can be adjusted between two positions.

According to a further design, the micro-mirrors can be tilted at any angle by means of an analog signal.

One configuration of the micro-mirror array includes a matrix of 607×638 mirrors with a side length between 5 and 10 µm.

Alternatively, the first spatial modulation element is designed as a liquid crystal display, wherein the plurality of pixels are implemented by a plurality of liquid crystals. Using the control and evaluation unit, the transparency of the individual pixels for the light incident from the light-coupling element can be separately adjusted by arranging the liquid crystals.

According to one design, the entrance slit is generated by a liquid crystal display in a simple transparency. Alternatively, the liquid crystal display is backed with a mirror so that the light transmitted into the spectrometer passes through the liquid crystal display twice.

It is also conceivable that the first spatial modulation element is designed as a switchable grating. According to this design, each pixel consists of a separate switchable grating including a plurality of metal strips, each of which can be arranged into an ON position and an OFF position.

In addition to the designs described above, the first spatial modulation element can also be implemented by other components, not mentioned here, which transmit incident light pixel by pixel.

According to one design, the pixels of the first spatial modulation element are arranged during operation in such a manner that a column of the first spatial modulation element transmits the light of the incident light sample in the direction of the dispersive element, and that the remaining pixels (in the OFF position) are arranged in such a manner that the remaining part of the light sample hitting the first spatial modulation element is not transmitted into the spectrometer.

The slit width of the entrance slit is determined by the number of pixels that transmit the light in each row in the direction of the dispersive element. According to a preferred design, the slit width is constant in relation to the longitudinal direction of the slit.

In addition, it is also conceivable that the slit width is different in the longitudinal direction of the slit, i.e. line by line. For example, the slit can be widened in sections. According to this design, the slit shape is watered down at the expense of the resolution of the spectrometer, but the light yield is increased by widening the slit section by section.

Before each measurement, the slit width and/or the slit shape can be adapted to the measurement situation, in particular to the image of the light sample to be measured.

In addition, the spectrometer is designed in such a manner that the slit width and/or the slit shape can also be varied and adapted during the measurement of a light sample, i.e. during the acquisition of a spectrum. In this respect, the spectrometer can also be optimized during operation, in particular for the acquisition of individual spectral components with regard to the luminous efficacy and resolution available for analysis.

According to one design, all pixels of the first spatial modulation element are arranged during operation in such a manner that the image of the light sample to be analyzed hitting the modulation element is transmitted completely to the spectrometer. In this case, a particularly large amount of light enters the spectrometer.

In any case, the configuration according to the invention has the advantage that the slit width and/or the slit shape can be adjusted and changed quickly and precisely. In this manner, depending on the measurement situation, the spectrometer can be optimized particularly quickly in terms of resolution and available luminous efficacy before or during a measurement, which improves the overall measurement characteristics of the spectrometer.

The control and evaluation unit can be designed as a single component or alternatively can include separate components.

According to one design, at least one light-coupling element is designed as an optical waveguide or as an optical waveguide bundle. The optical waveguide is especially preferred as a glass fiber or the optical waveguide bundle is especially preferred as a glass fiber bundle.

If a single glass fiber typically has a diameter of approx. 100 μm according to its design, and if the individual mirrors of a micro-mirror array have a side length of approx. 5 μm, then the image of the glass fiber or the glass fibers that hits the first micro-mirror array can be trimmed particularly precisely.

It is also particularly preferred when the dispersive element is designed as an optical grating, for example as a reflection grating.

The detector element, for example, is designed as a line detector. This design is particularly advantageous when the spectral components behind the dispersive element hit the detector directly. According to this design, the spatially distinguishable spectral components can be detected simultaneously.

According to an alternative design, the detector element is designed as a single detector. According to this design, the spectrum of the light sample is preferably sequentially scanned during operation.

According to another particularly preferred design, the first spatial modulation element is located on the optical path in front of the dispersive element and, furthermore, between the dispersive element and the detector element, wherein the pixels are arranged in such a manner in a first partial region of the first spatial modulation element that, during operation, the light incident from the light-coupling element is at least partially transmitted to the dispersive element, and that the pixels are arranged in such a manner in a second partial region of the first spatial modulation element that, during operation, the spectral components of the light sample to be examined are preferably sequentially directed onto the detector element.

For example, the upper half of the first spatial modulation element is arranged as an entrance slit and the lower half of the first spatial modulation element is located in front of the detector element as the element transmitting the spectral components of the light to be analyzed. Alternatively, the right half of the first spatial modulation element is arranged as the entrance slit and the left half of the first spatial modulation element is arranged as the element transmitting the spectral components of the light to be analyzed before the detector element. In addition, any other suitable separation of the first spatial modulation element into at least two or more partial regions is conceivable, each of which implementing different functions during operation.

According to another preferred design of the spectrometer, a second spatial modulation element including a plurality of pixels is provided, wherein each pixel can be arranged separately by the control and evaluation unit, wherein the second spatial modulation element is located on the optical path between the dispersive element and the detector element, wherein the control and evaluation unit deflects the plurality of pixels of the second spatial modulation element during operation such that the spectral components of the light sample to be examined are preferably sequentially directed onto the detector element.

The design in which the individual spectral components of the light sample to be examined are detected one after the other has the advantage that overlapping of the diffraction patterns of different wavelengths can be avoided.

In addition, this design also allows the slit width and/or the slit shape of the entrance slit or the arrangement of the pixels of the first spatial modulation element to be adjusted during the measurement of a light sample depending on the currently detected spectral component. This is particularly advantageous when, in one part of the spectrum, the spectral lines of the two analytes of interest are closely adjacent and thus place high demands on the resolution of the spectrometer, while, in another part of the spectrum, several lines of a single analyte are locally isolated and the integral across all lines is sufficient for their evaluation, so that the light yield can be optimized at the expense of the resolution. In this respect, this design can also be used during a measurement to ensure that the optimum setting of the spectrometer in terms of resolution and luminous efficacy is guaranteed depending on the individual spectral components.

According to one design, the second spatial modulation element is designed as a micro-mirror array or as a liquid crystal display or switchable grating or as an equivalent component.

According to a second teaching of the invention, the above-mentioned object is achieved by a method described above for analyzing a light sample in that the variable entrance slit is implemented by a first spatial modulation element including a plurality of pixels, wherein the individual pixels can be arranged independently of one another by the control and evaluation unit, wherein the individual pixels are arranged for implementing the entrance slit during operation in such a manner that at least a part of the light incident from the light-coupling element is transmitted to the dispersive element, wherein the width of the entrance slit is varied depending on the measurement situation before and/or during a measurement by deflecting the individual pixels, that the light sample to be analyzed is separated by the dispersive element into its spectral components, that the spectral components of the light sample are imaged onto the detector element, and that the control and evaluation unit determines the spectrum of the light sample.

Adapting the arrangement of the individual pixels of the first spatial modulation element is carried out according to one implementation of the method by first arranging all pixels into the OFF position at least before commissioning the spectrometer. The image of the light-coupling element is then scanned by arranging the individual pixels one after the other into the ON position, wherein the intensity transmitted by each arranged pixel is simultaneously detected at the detector element.

According to one design, all pixels of the first spatial modulation element are arranged line by line one after the other into the ON position.

According to a further design, the arrangement of individual pixels from the second row of the first spatial modulation element is carried out only in the column in which a maximum light intensity was determined in the previously measured row, and additionally in the 5 columns in front of and behind it. If, for example, it was determined that, in the first row, the pixel in column 20 passed on the highest light intensity when arranged in the ON position, then, in the second row, only the pixels in columns 15 to 25 are arranged one after the other into the ON position and the intensity passed on in each case is recorded. This design has the advantage that not all pixels have to be arranged to adjust the arrangement of the first spatial modulation element.

In addition to the algorithms described above, further algorithms are conceivable according to which an advantageous scan of the image of the light-coupling element can be achieved by the sequential arrangement of individual pixels.

A corresponding scan takes place at least before the spectrometer is put into operation. Furthermore, the scan described above can also be carried out when the light-coupling element is changed. It is also conceivable that a scan for adjusting the arrangement of the pixels is carried out before each measurement.

According to a preferred design, the spectrometer is designed according to one of the previously described configurations.

Furthermore, it is preferred when the slit width and/or the slit shape of the entrance slit is varied during operation depending on the spectral component of the light sample to be examined which falls on the detector element.

According to a further design, the slit shape of the entrance slit is varied depending on the measurement situation before and/or during a measurement by adjusting the slit width of the entrance slit line by line.

In addition, it is advantageous when the light-coupling element is designed as an optical waveguide bundle of linearly arranged optical waveguides, that the pixels of the first spatial modulation element are deflected line by line in such a manner that a deviation of individual optical waveguides from the linear configuration is corrected.

For example, the image of the optical waveguide bundle can be trimmed into a column for correction by arranging the individual pixels of the first spatial modulation element.

This means that the pixels of the modulation element are arranged in such a manner that a column of the image of the optical waveguide bundle is transmitted to the spectrometer. The column consisting of the individual pixels is configured in such a manner that, despite a faulty arrangement of at least one optical waveguide, all pixels which are arranged into the ON position are substantially fully illuminated by the image of the optical waveguides. The slit width can vary depending on the application and/or can be adjusted before each measurement or during a measurement.

In addition, it is still advantageous when the shape of all the pixels of the first spatial modulation element transmitting the light into the spectrometer is adapted to the shape of the image of the optical waveguide bundle for correction. For this, for example, the pixels arranged into the ON position are arranged offset to the other pixels arranged into the ON position in at least one line. The slit width and/or the slit shape can also vary according to the measurement situation and/or can be adjusted before each measurement or during a measurement.

A previously described correction of an irregular shape of the image of the light-coupling element can be set, for example, by scanning the image when the spectrometer is put into operation.

In detail, there is now a plurality of possibilities for designing and further developing the spectrometer and the method according to the invention. For this, reference is made both to the patent claims subordinate to the independent patent claims and to the following description of preferred embodiments with reference to the accompanying drawings.

DETAILED DESCRIPTION OF THE INVENTION

Figure 1:
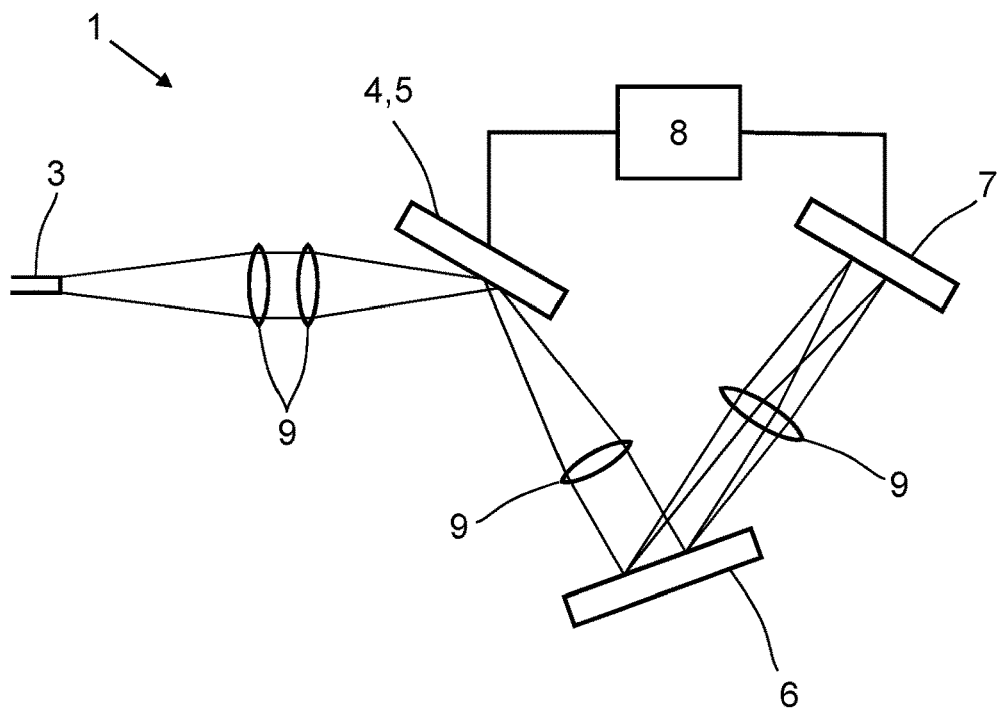
FIG. 1 a first embodiment of a spectrometer according to the invention.

FIG. 1 shows a first embodiment of a spectrometer 1 with a light-coupling element 3 in the form of a glass fiber, with a variable entrance slit 4 formed by a first spatial modulation element in the form of a first micro-mirror array 5, with a dispersive element 6 formed as a reflecting diffraction grating, with a detector element 7 and with a control and evaluation unit 8. The individual micro-mirrors of the micro-mirror array 5 can each be arranged separately by applying a voltage through the control and evaluation unit 8. During operation, the individual mirrors are deflected in such a manner that at least part of the light incident via the glass fiber is imaged onto the detector element 7 via an optical path. In addition to these elements, the optical path also has optical lenses 9 for beam shaping and focusing of the light sample to be examined.

Figure 2:
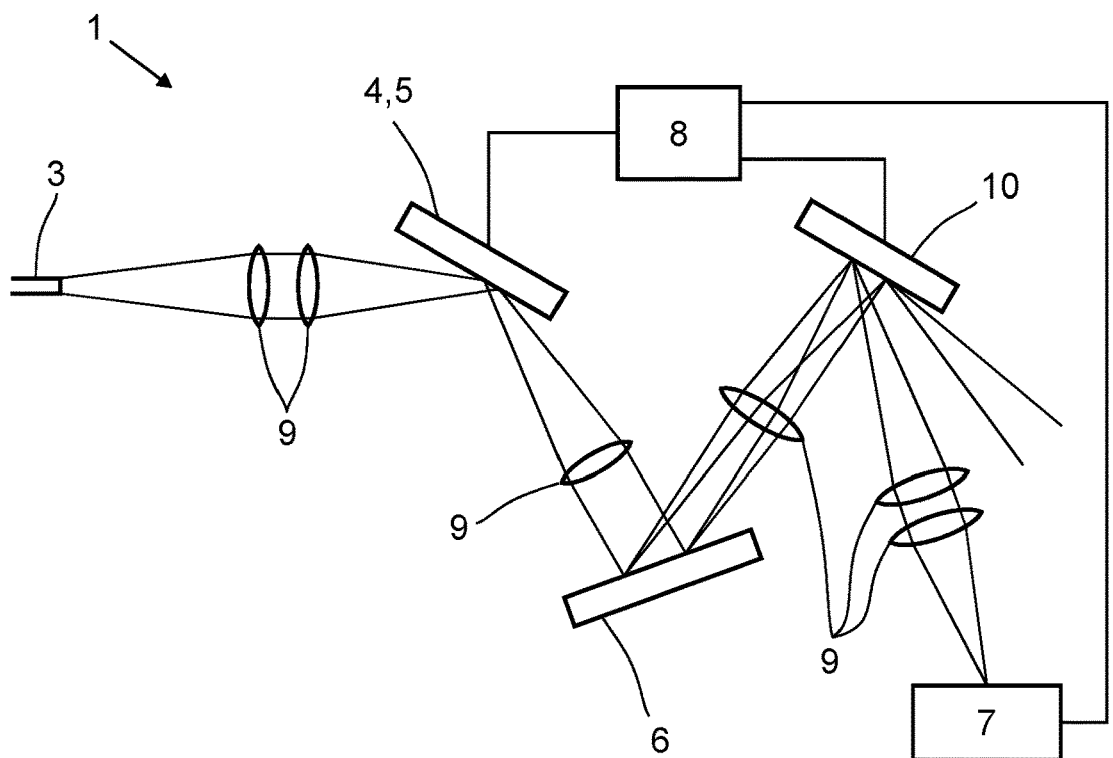
FIG. 2 a second embodiment of a spectrometer according to the invention.

A second embodiment of a spectrometer 1 is shown in FIG. 2, wherein, in contrast to the spectrometer 1 shown in FIG. 1, a second spatial modulation element in the form of a second micro-mirror array 10 is located between the dispersive element 6 and the detector 7, which can also be controlled by the control and evaluation unit 8. The control and evaluation unit 8 deflects the plurality of the micro-mirrors of the second micro-mirror array 10 during operation in such a manner that the spectral components of the light sample to be examined separated by the diffraction grating are sequentially deflected onto the detector element 7. In the embodiment shown, the detector element 7 is designed as a single detector. The shown configuration has the advantage that no overlapping of the diffraction maxima of different wavelengths occurs or is detected during the acquisition of the individual spectral components, whereby the accuracy of the spectrometer is particularly high. This embodiment also has the advantage that the slit width of the entrance slit 4 can also be adjusted during a measurement depending on the spectral component of the light sample to be examined currently hitting the detector element 7.

Figure 3:
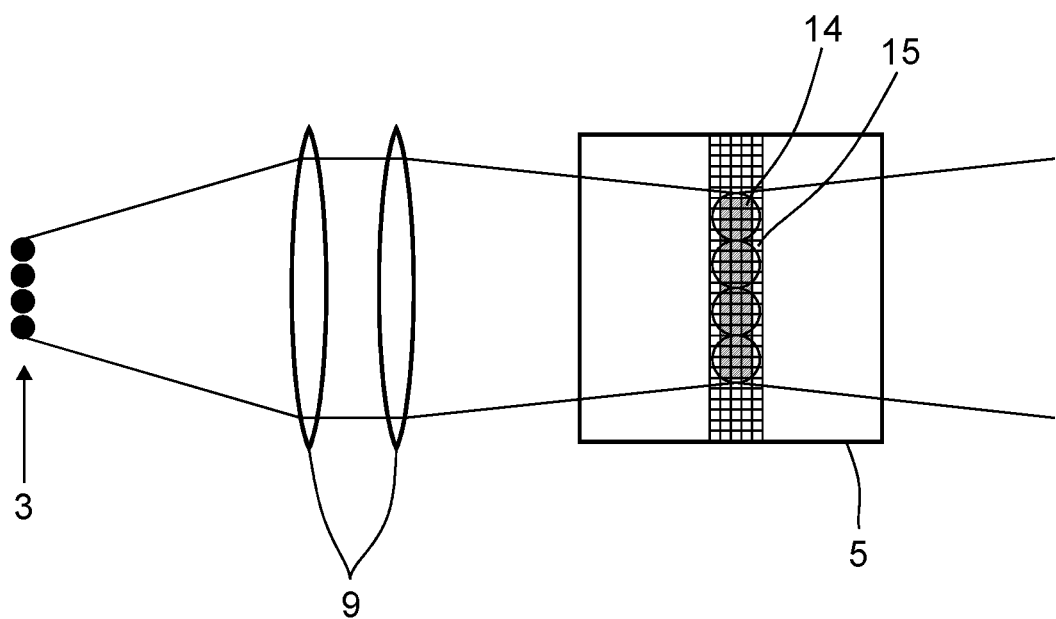
FIG. 3 a third embodiment of a spectrometer according to invention.

In the embodiment of a spectrometer 1 shown in FIG. 3, the light-coupling element 3 is designed as a glass fiber bundle, wherein the individual glass fibers are positioned linear to each other. The image of this glass fiber bundle is directed through an imaging optic onto the first micro-mirror array 5. What is shown is a micro-mirror array 5 and a part of the micro-mirrors. The individual mirrors of the micro-mirror array 5 are arranged in such a manner that a column-shaped part of the image of the glass fiber bundle is transmitted to the spectrometer. A column-shaped part of the micro-mirrors is arranged in the ON position 14. The remaining part of the micro-mirrors reflects the incident light in the OFF position 15 away from the dispersive element 6. The slit width is selected so that all mirrors arranged in the ON position are essentially fully illuminated and that the spectrometer 1 is optimized overall with regard to luminous efficacy and resolution.

Figure 4:
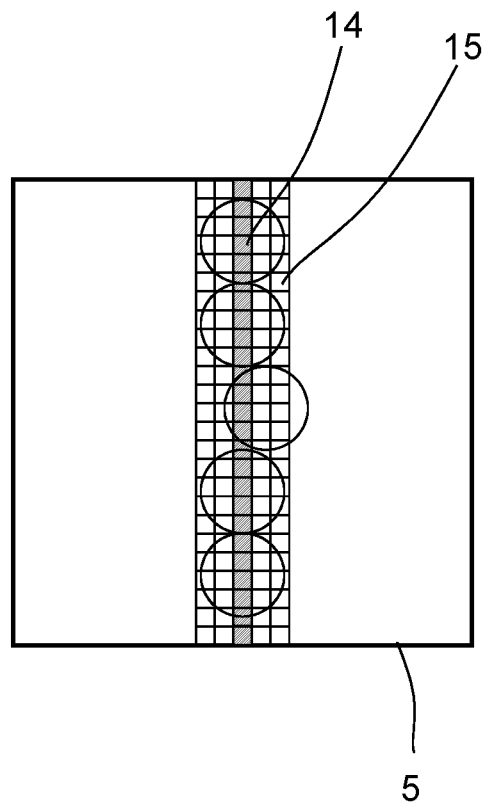
FIG. 4 an embodiment of an image of an optical waveguide bundle on a first micro-mirror array, FIG. 5 another embodiment of an image of an optical waveguide bundle on a first micro-mirror array FIG. 6 another embodiment of a spectrometer according to the invention, FIG. 7 another embodiment of an image on the first micro-mirror array, and FIG. 8 a first embodiment of a method according to the invention.

FIG. 4 shows an embodiment of an image of an optical waveguide bundle on a first micro-mirror array 5. In the embodiment shown, an optical waveguide is positioned offset to the other optical waveguides, deviating from the linear arrangement. This faulty positioning can be corrected during operation in that the light-transmitting slit, i.e. the micro-mirrors arranged in the ON position 14, are positioned in such a manner that all micro-mirrors are essentially fully illuminated despite the offset arrangement. In this manner, the complete image of the glass fiber bundle can be trimmed so that a deviation of individual optical fibers from the linear positioning is corrected with respect to transmission into the spectrometer. The slit width in the embodiment shown corresponds to the width of a micro-mirror. In addition, the slit width can, of course, also include several micro-mirrors and can be adapted to the measurement situation, especially during operation.

Figure 5:
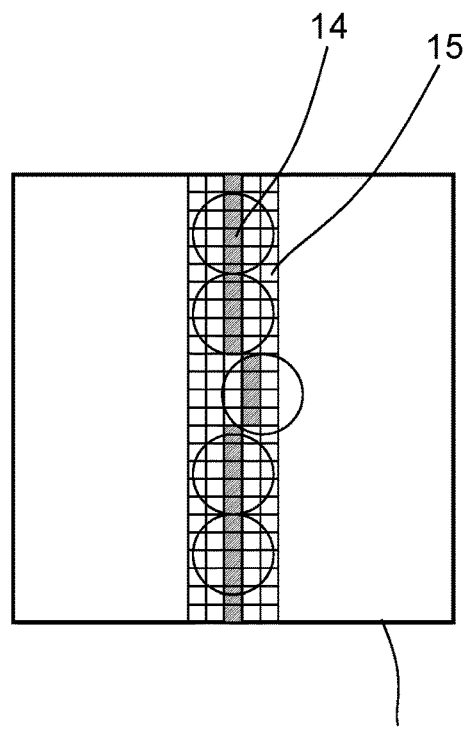

FIG. 5 shows another embodiment of an image of an optical waveguide bundle on a first micro-mirror array 5, wherein an optical waveguide is also positioned offset to the other optical waveguides in a manner that deviates from the linear positioning. In contrast to the illustration shown in FIG. 4, this faulty positioning is corrected in that the micro-mirrors, which are arranged in the ON position 14, are also arranged line by line with the other micro-mirrors arranged in the ON position 14 in the area of the image of the offset light-wave light guide. As a result, the shape of the micro-mirrors arranged in the ON position 14 is adapted to the shape of the image of the optical fiber bundle.

Figure 6:
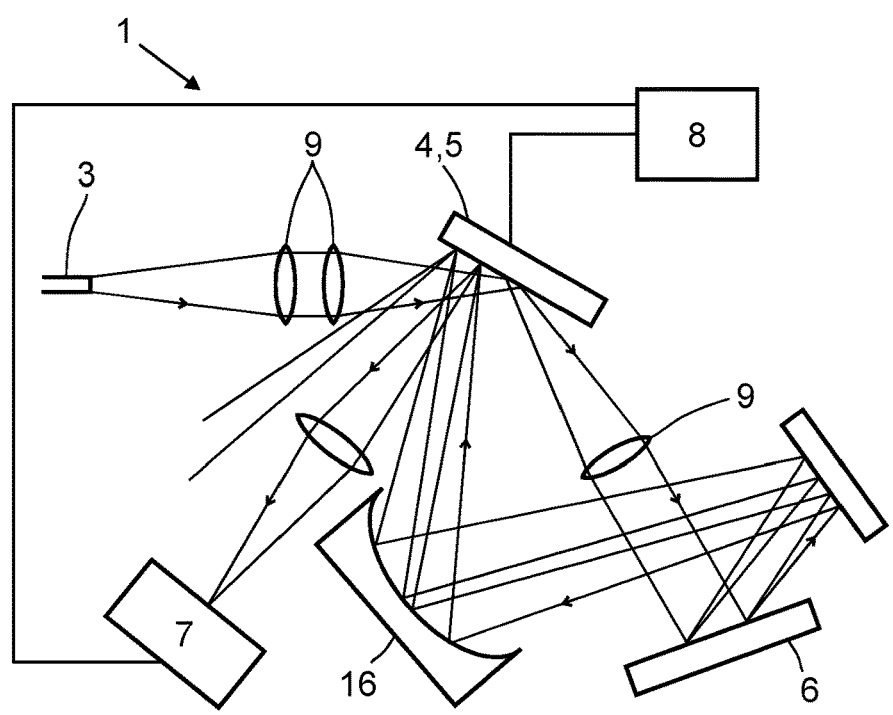

FIG. 6 shows another embodiment of a spectrometer 1. The first micro-mirror array 5 is positioned in such a manner that it is located in the beam path on the one hand in front of the dispersive element 6 and on the other hand between the dispersive element 6 and the detection element 7. The course of the beam path is indicated by arrows on the illustrated light beams.

In detail, a first partial region 17 of the micro-mirror array 5 implements the function of the entrance slit 4 and a second partial region 18 implements the function transmitting individual spectral components to the detection element 7. For this, the light to be analyzed is focused on the second partial region 18 of the micro-mirror array 5 by means of a confocal mirror 16.

Figure 7:
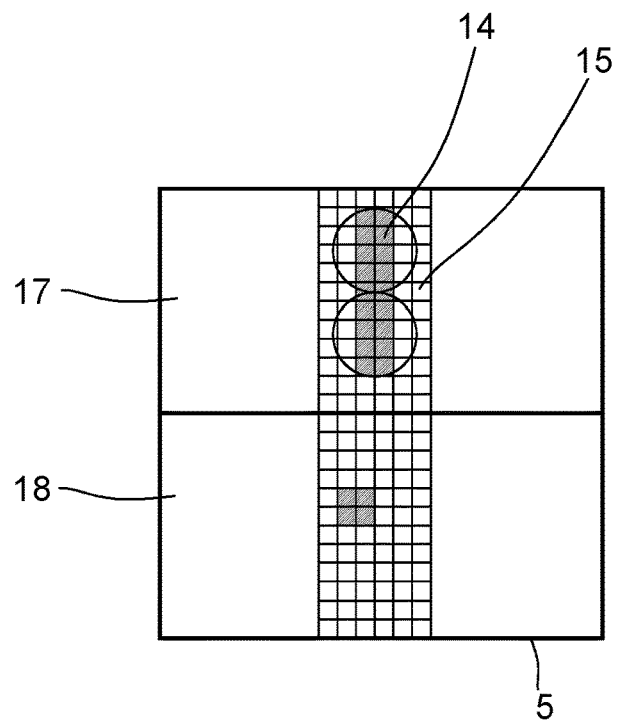

FIG. 7 shows the image of the light to be analyzed on the micro-mirror array 5 according to the arrangement shown in FIG. 6. The illustration shows a first partial region 17, which implements the function of an entrance slit 4, and a second partial region 18, which directs the spectral components onto the detection element 7.

Alternative embodiments show a liquid crystal display or a switchable grating as the first and/or second spatial modulation element otherwise having the same design of the spectrometer as shown in FIGS. 1 to 7.

Figure 8:
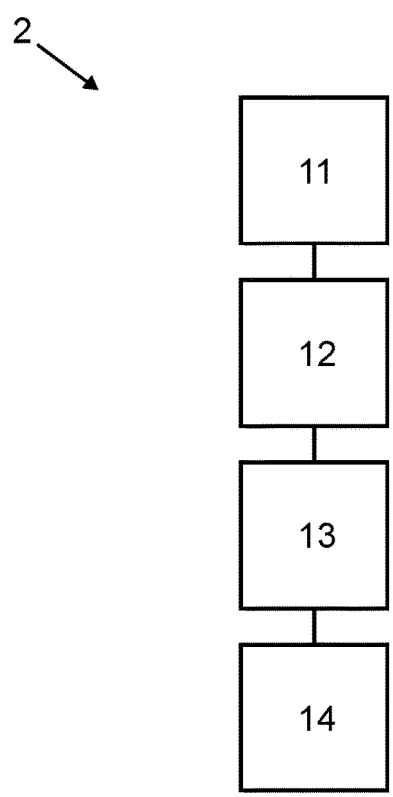

FIG. 8 shows an embodiment of a method 2 for analyzing a light sample, wherein the spectrometer 1 is designed according to the embodiment shown in FIG. 2. First, when the spectrometer is put into operation, the image of the light-coupling element is scanned to determine the orientation of the micro-mirrors of the first micro-mirror array 5. Depending on the scanned image and on the measuring situation, the micro-mirrors are arranged in the ON position 14 or in the OFF position 15.

In a first step 11 of the method 2, the light sample to be examined is now coupled into the spectrometer 1 via the light-coupling element 3. Via the first micro-mirror array 5, the incident light is transmitted in the form of a slit with a defined slit width to the dispersive element 6 and broken down into its spectral components by the dispersive element 6. Furthermore, the individual spectral components are imaged 12 sequentially onto the detector element by deflecting the individual mirrors of the second micro-mirror array 10. The slit width of the entrance slit 4 is adapted by the control and evaluation unit 8 13 to the spectral component currently hitting the detector element 7. Finally, the control and evaluation unit 8 determines 14 the spectrum of the light sample to be examined.

The illustrated method 2 has the advantage that an optimization with regard to the resolution of spectrometer 1 and the luminous efficacy, i.e. the amount of light transmitted into spectrometer 1, can be carried out particularly precisely, especially during a measurement.

What is claimed is:

1. A spectrometer for analyzing a light sample comprising:
   at least one light-coupling element;
   a variable entrance slit;
   a dispersive element for separating the light samples into its spectral components;
   a detector element; and
   a control and evaluation unit comprising a controller and an analyzer for determining a spectrum of the light sample,
   wherein the variable entrance slit is located before the dispersive element and is implemented by a first spatial modulation element comprising a plurality of individual pixels which are independently arrangeable relative to one another by the control and evaluation unit, and
   wherein the individual pixels are arranged in order to implement the entrance slit during operation in such a manner that at least part of the light incident from the light-coupling element is passed from the variable entrance slit on to the dispersive element so that the entrance slit has a width that is variable depending on a measurement situation occurring during operation.

2. The spectrometer according to claim 1, wherein the first spatial modulation element is configured as a first micro-mirror array, and wherein the plurality of pixels are implemented by a plurality of micro-mirrors.

3. The spectrometer according to claim 1, wherein the at least one light-coupling element is designed as an optical waveguide or as an optical waveguide bundle.

4. The spectrometer according to claim 1, wherein the first spatial modulation element is located on the optical path in front of the dispersive element and, furthermore, between the dispersive element and the detector element, the pixels are arranged in a first partial region of the first spatial modulation element that, during operation, the light incident from the light-coupling element is at least partially transmitted to the dispersive element, and that the pixels are arranged in a second partial region of the first spatial modulation element that, during operation, the spectral components of the light sample to be examined are sequentially directed onto the detector element.

5. The spectrometer according to claim 1, characterized in that a second spatial modulation element comprising a plurality of pixels is provided, wherein each pixel can be separately arranged by the control and evaluation unit, wherein the second spatial modulation element is arranged on the optical path between the dispersive element and the detector element, wherein the control and evaluation unit deflects the plurality of pixels of the second spatial modulation element during operation such that the spectral components of the light sample to be examined are sequentially deflected onto the detector element.

6. The spectrometer according to claim 1, wherein the detector element is configured as an individual detector.

* * * * *